April 6, 1948.  J. R. PATTEE  2,439,096
ELECTRIC MOTOR CONTROL SYSTEM
Filed Sept. 29, 1943  2 Sheets-Sheet 1
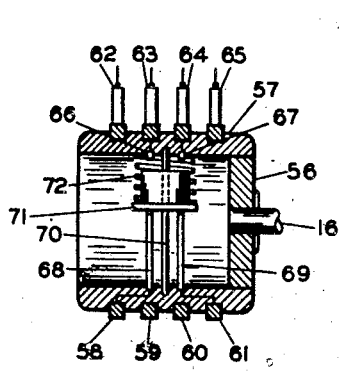
FIG. 2
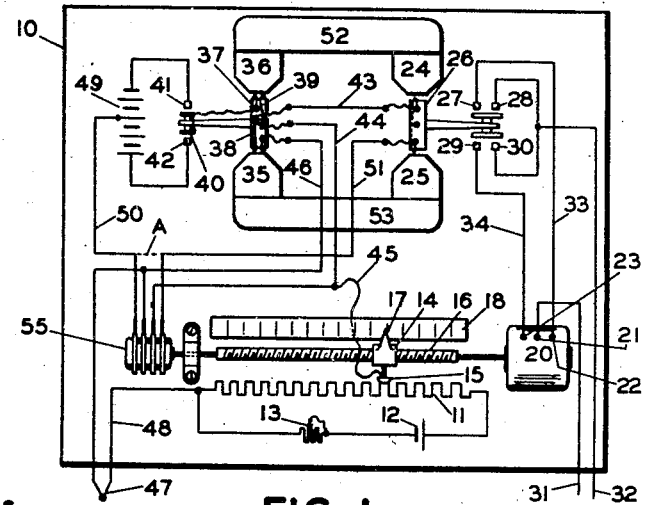
FIG. 1
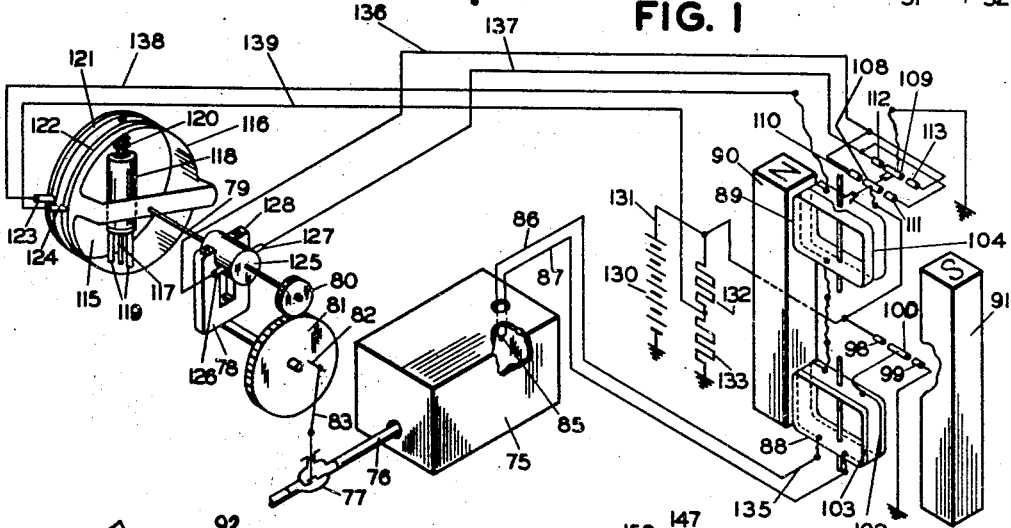
FIG. 3
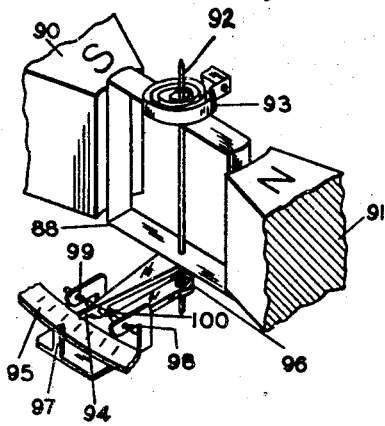
FIG. 4
FIG. 5
INVENTOR.
John Robert Pattee
BY
E. C. Sanborn
Attorney April 6, 1948.                J. R. PATTEE                2,439,096
                      ELECTRIC MOTOR CONTROL SYSTEM
                    Filed Sept. 29, 1943        2 Sheets-Sheet 2

INVENTOR.
JOHN ROBERT PATTEE
BY
E. C. Sanborn
ATTORNEY

Patented Apr. 6, 1948

2,439,096

UNITED STATES PATENT OFFICE 2,439,096

ELECTRIC MOTOR CONTROL SYSTEM

John Robert Pattee, Waterbury, Conn., assignor to The Bristol Company, Waterbury, Conn., a corporation of Connecticut Application September 29, 1943, Serial No. 504,219

9 Claims. (Cl. 318—28)

This invention relates to the control of electric motors, and more especially to means for regulating the performance of a motor in response to a relatively weak commanding influence. While the principle of the invention is adaptable to motors of substantially any size in conjunction with suitable relay devices therefor, it is hereinafter described in its application to the control of servomotors of the class embodied in self-balancing systems, such as potentiometers, or automatic regulators of temperature or the like, in which fields of application the meritorious features of the invention have been found to be particularly obvious.

In the operation of mechanisms for automatically restoring the balance of an electrical network, such as a potentiometer or a bridge, it is customary to make use of a servomotor mechanism comprising a reversible electric motor combined with suitable relay means for causing said motor to respond to any departure of the system from a balanced condition and to operate balance-restoring instrumentalities in a sense to offset or nullify said departure. As an important adjunct to such devices it is frequently found desirable to provide means for bringing the mechanism to its final position of balance by a series of impulses in each of which the motor receives full power for the time it is active, but which are progressively spaced farther apart as a condition of balance is approached. Thus, however small the increment of motion necessary to complete the balancing operation, the full torque of the motor is available for moving the mechanism.

As an example of the prior art in devices of this class, reference may be had to U. S. Letters Patent 2,022,097, issued to F. F. Uehling, November 26, 1935. In that patent there is set forth a self-balancing mechanism wherein the performance of the balancing motor is controlled by a pair of similar relays substantially instantaneous in their action, and having an element of time introduced into said action by means of a third relay characterized by a definite timing feature and adapted to react on the controlling circuits in a manner to cause said first named relays to actuate the motor in a series of progressively spaced impulses in each of which full power is applied to said motor.

Said patent to Uehling discloses also a "regenerative" principle whereby the torque of the sensitive galvanometer in the balancing system is amplified, thus preventing chattering at the contacts, and said regenerative action is subject to the control of said timed relay. It will be obvious that the timing of such a relay, when fitted with a slug or lagging coil as set forth in said patent, is to a great extent established by the design of the relay and is not subject to change in response to varied demands of the operation of the equipment. It thus becomes necessary that timing element must be more or less "artificially" coordinated with the starting and stopping characteristics of the motor and mechanism, as governed by inertia and other mechanical features. Thus, in a self-balancing potentiometer or similar instrument the timing of each individual system must be adjusted by an experienced workman.

In a controller, where a relatively powerful motor is necessary, said motor being normally slower in acceleration than that of a self-balancing potentiometer, the cutting off of the regenerative effect and of the power applied to the motor must be delayed to such an extent that incorporation of a suitable timing characteristic in a relay requires the use of auxiliary devices in the nature of dash-pots or relatively large capacitors. Not only do such accessories introduce additional features wherein failure is likely to occur under extreme temperatures or other disturbing conditions, but in the event of change in the motor characteristics the delicate balance between said characteristics and those of the accessories may be seriously disturbed. If the pulses of power are made so short that the motor does not have time to attain its normal velocity before having its power supply interrupted, its operation will be inefficient with a consequent tendency to overheating. If, on the other hand, the timing of the impulse is made too long the performance as the final balance point is approached will be seriously disturbed and the purposes of the timing device to a great extent nullified.

It is an object of the present invention to provide means whereby the desirable characteristic of having a balancing motor approach the final balance point by a series of increasingly spaced impulses may be incorporated in the control system of said motor by the use of means subject to the operation of the motor, rather than to externally adjusted timing elements.

It is a further object to provide a motor control in which the operation of the motor, once initiated by a relatively delicate contact engagement, will be continued through an intensified action of said contacts, and will be terminated only when the motor has attained a predetermined velocity.

It is a further object to provide a device of the above nature in which the operation of the motor, as controlled by a combination of relays, will itself be reflected in the performance of the relay system in such a manner as to react upon the motor and maintain its average velocity substantially constant during considerable deflections of the balancing instrumentalities, and to cause the motor to come to rest by a series of increasingly spaced increments as a condition of balance is approached.

It is a further object to provide a device of the above character in which, however widely spaced or brief in duration the increments of approach of the mechanism to the final balance position, full power will be available for operating the motor during each of said increments.

It is proposed to provide, in combination with a servomotor, a galvanometer and a relay interrelated in such a manner that, while the relay which controls the motor current is in turn commanded by the galvanometer, the current which actuates the relay reacts upon the galvanometer in a sense to amplify or supplement its deflections, while at the same time a centrifugal device mechanically actuated by the motor tends to modify the currents in the windings of both the relay and the galvanometer.

The purpose of the centrifugal device is not primarily to limit or regulate the speed of the motor, as in many well-known speed regulators, but simply to act as a switch in interrupting the auxiliary current flowing in the control circuit when the motor has reached a sufficient speed. Said centrifugal device may be considered as replacing the timing relay shown in the Uehling patent hereinbefore referred to, thus rendering the interruption of the auxiliary current, and therefore the termination of the impulses, subject, not to a definite time setting, but to the time required for the motor to attain a predetermined operating velocity.

The circuit controlling means actuated by the centrifugal device may take any one of a number of electrical and mechanical forms. Electrically it may serve to actuate a single set of contacts whereby the current supply to the motor is interrupted when the critical velocity is attained, or it may include an extra pair of contacts adapted to close at said velocity and short-circuit deflecting elements of the control instrumentalities, whereby a desirable damping action will be obtained.

In the drawings:

Fig. 1 is a diagrammatic representation of a self-balancing potentiometer embodying the principles of the invention.

Fig. 2 is a sectional view of an element of the mechanism illustrated in Fig. 1.

Fig. 3 is a diagram in perspective, showing a control system embodying the invention in a modified form.

Fig. 4 is a detailed perspective representation of certain elements of the device shown in Fig. 3.

Fig. 5 is an illustration of a centrifugal device adapted to the purposes of the invention.

Figure 6:
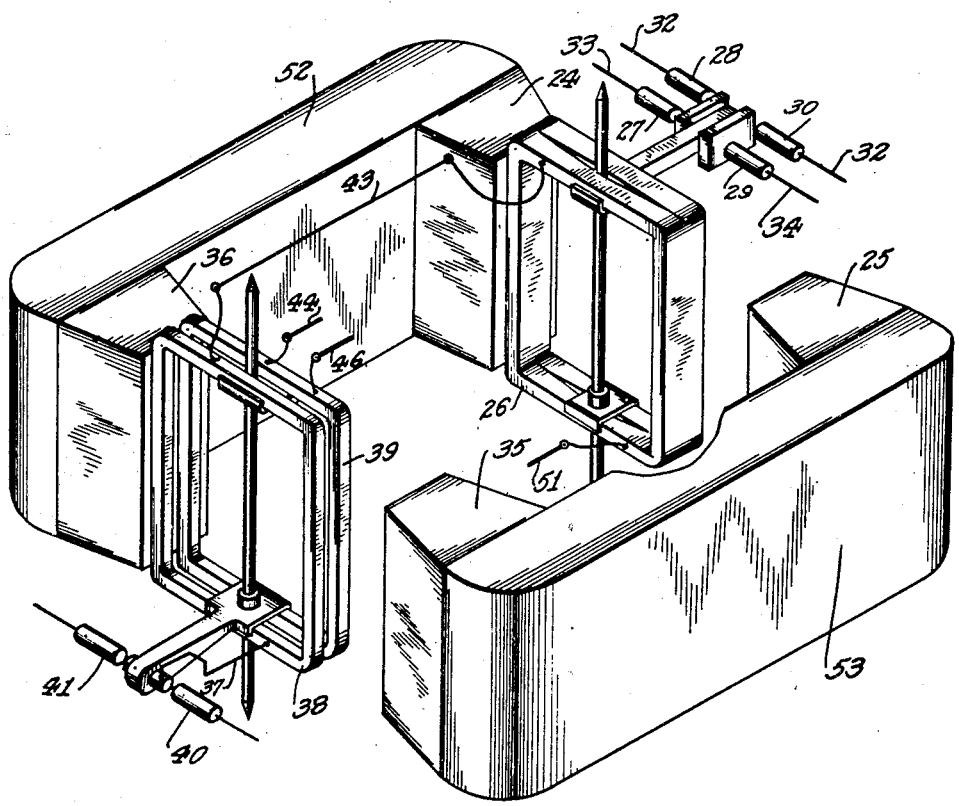
Fig. 6 is a detail perspective view showing a portion of the apparatus of Fig. 1 on an enlarged scale (the magnet structure 25—53—35 being shown displaced sufficiently from its normal position to render the coils clearly visible).

In Fig. 1 the numeral 10 designates a mounting base upon which is positioned an extended slide-wire structure 11 adapted to be supplied with current from a battery 12 through an adjustable resistor 13, whereby there may be maintained in said slide-wire a current of predetermined magnitude, establishing a corresponding predetermined potential gradient over the length of the slide wire. A carriage 14, translatable through a predetermined path parallel to the extended length of said slide wire, carries a contact member 15 adapted to engage said slide wire at any point, whereby the potential between said contact and either end of the slide wire will depend upon the translated position of said carriage. A lead screw 16 extending parallel to the slide wire structure 11, and mounted for rotation about its extended axis, threadedly engages the carriage 14, whereby rotation of said screw will cause the carriage and the contact borne thereby to be moved to different positions with reference to the slide wire 11. An index or pointer 17 attached to the carriage 14, in cooperation with a stationary extended graduated scale 18, provides an indication of the translated position of said carriage. An electric motor 20 operably connected to the lead screw 16 to rotate the same, is provided with a double set of internal windings having a common terminal 21 and separate terminals 22 and 23; said windings being so disposed and connected that upon the application of potential between terminals 22 and 21 the motor will operate in a sense to translate the carriage 14 and parts borne thereby toward the right as seen in the drawing, and upon the application of potential between the terminals 23 and 21, will operate in a sense to translate the carriage toward the left.

Operation of the motor 20 is effected through a contact system forming a part of a directional relay which may be described as follows: Between permanent magnet poles 24 and 25 is pivoted a coil 26 having a single winding and being adapted to deflect through a limited angle about an axis midway between said poles, and in a sense depending upon the direction of current in said winding. The coil 26 is normally maintained in an intermediate position from which it may be deflected in either direction by means of one or more control springs, not shown in the drawing, and which may also serve as flexible leads providing electrical connection between said coil and the circuits external thereto. A contact member carried by the moving part of the directional relay is adapted alternatively to bridge contacts 27—28 or contacts 29—30, according to whether coil 26 is deflected in a counter-clockwise or a clockwise sense. To the motor terminal 21 is connected a conductor 31 forming one side of an electric power source; and the contacts 28 and 30 are both connected to a conductor 32 forming the other side of said source. The contact 27 is connected by a conductor 33 to the motor terminal 22 and the contact 29 by means of a conductor 34 to the terminal 23. Thus upon deflection of the coil 26 in a counter-clockwise sense, electric power from the source 31—32 will be applied through the contacts 27—28 and associated conductors to the terminals 22—21 of the motor 20, causing the same to operate in a sense to move the carriage 14 and elements carried thereby toward the right as seen in the drawing. Similarly, upon deflection of the coil 26 in a clockwise sense, the carriage 14 will be caused to move toward the left.

Actuation of the relay including the movable coil 26 is effected through a galvanometer which may be described as follows: Between magnet poles 35 and 36 is pivoted a movable element 37 adapted for deflection through a limited angle about an axis midway between said poles, said movable element having two windings 38 and 39, electrically independent and having separate terminals. The movable element 37 is normally maintained in an intermediate position by means of one or more control springs, not shown in the drawing, and also available as flexible conductors to the windings 38 and 39. The element 37 carries a contact member 40, insulated from the windings and electrically connected to one terminal of the winding 38, and adapted to engage either of two stationary contacts 41—42 in accordance with the sense in which the element 37 may be deflected. The free terminal of the winding 38 is connected by means of a conductor 43 to one terminal of the coil 26. One terminal of the winding 39 is connected by means of a conductor 44 and a flexible lead 45 to the sliding contact 15, and the other terminal of said winding by means of a conductor 46 to one side of a thermocouple or other source of E. M. F. 47 to be measured; and the other side of said source is connected by means of a conductor 48 to one end of the slide-wire 11. The stationary contact members 41 and 42 are directly connected to opposite terminals of a battery or similar D.-C. source having a middle tap to which is connected a conductor 50. To the free end of the relay coil 26 is connected a conductor 51; and, for purposes of explanation, the conductors 50 and 51 for the present may be considered as being connected together as shown at A in Fig. 1.

The magnet poles 24—25 and 35—36 may expediently be incorporated in a common magnetic circuit by connecting them magnetically in series by means of bars 52 and 53, whereby the relay element and the galvanometer element become an integral structure with a common magnetic system of a form fully described and set forth in my co-pending application Serial No. 485,581, filed May 4, 1943, now Patent Number 2,427,571 dated September 16, 1947. Either the poles 24—25 and 35—36 may be permanent magnet material, and the bars 52 and 53 of ferromagnetic material to serve as connecting yokes, providing a structure similar to that shown in Fig. 2 of said co-pending application; or the bars 52 and 53 may be the permanent magnets and the pole-pieces suitably conformed elements of ferromagnetic material, as shown in Fig. 3 of said application. Relative polarities of coils and magnets, and of the battery 49 are so selected that upon an increase of the potential developed between the terminals of the thermocouple or other source 47 above that represented by the portion of the slide-wire 11 included between the conductor 48 and the point of contact of the sliding contact 15 with the slide wire, current flowing through the circuit represented by said slide wire and sliding contact, the conductors 44, 45, 48, and 46 and the winding 39 will, by its reaction on the field in the air gap of the magnetic poles 35 and 36, tend to deflect the moving element 37 in a counter-clockwise sense, and upon a decrease of said developed potential below the value of the available part of the slide-wire potential, said coil will tend to be deflected in a clockwise sense. Upon engagement between contact members 40 and 42, corresponding to a counter-clockwise deflection of the movable element 37, current from the "lower" half of the battery 49 (as seen in the diagram) will flow through the winding 38, and in such a direction as to supplement the force due to the current flowing in the winding 39 to initiate said deflection, and through the conductor 43 and the coil 26 (tending to deflect it also in a counter-clockwise sense), completing the circuit through the conductors 51 and 50 (temporarily, as hereinbefore stated, joined at A). Deflection of the coil 26 in a counter-clockwise sense, as hereinbefore pointed out, will cause the motor 20 to operate in a sense to move the sliding contact 15 toward the right as shown in the drawings; so that with the conductor 48 connected to the left-hand end of the slide wire 11, the potential derived from the slide wire will be correspondingly increased, with a consequent tendency to restore to a zero value the current flowing through the galvanometer winding 39. Similarly, upon a decrease in the measured potential below that derived from the slide-wire, the current flowing in the winding 39 will tend to deflect the element 37 in a clockwise sense and bring into engagement the contacts 40 and 41, permitting current from the "upper" half of the battery 49 to flow through the windings 38 and 43 and the "temporary" connection A, causing the initial torque of the element 37 to be increased and the coil 26 to be deflected in a clockwise sense, causing the motor 20 to move the sliding contact 15 toward the left as shown in the drawings, with a consequent tendency to equalize the slide wire potential and the measured potential and reduce to zero the current flowing in the galvanometer winding 39. It has thus been shown that upon any change of measured potential from equality with that represented by the position of the slider 15 along the slide-wire 11, the motor 20 will be energized in a sense to move the slider toward a position of equalization; and it will be obvious that the relay current passing through the galvanometer winding 38 as well as through the relay coil 26 will tend to amplify galvanometer contact pressure, and eliminate objectionable chattering; but the method of breaking this current and releasing both the galvanometer and the relay contacts has not yet been set forth. The apparatus for, and the manner of, effecting this result will be understood by reference to Fig. 2 taken in conjunction with Fig. 1.

Mounted upon the shaft 16, and rotatable therewith is a centrifugal device 55 comprising a plate 56 to which is affixed a hollow cylindrical shell 57 formed of insulating material such as vulcanite or Bakelite. Encircling the outer surface of the shell 57, and fixed thereto are four metallic collector rings 58, 59, 60 and 61; and mounted on the base 10 but insulated therefrom are corresponding brushes 62, 63, 64 and 65, engaging said rings in order of assigned numerical sequence. Mounted on the interior wall of the shell 57 are two juxtaposed conducting studs 66 and 67, electrically connected to the rings 59 and 60 respectively; and diametrically opposite the studs 66 and 67 and mounted on the interior wall of the shell are another two juxtaposed conducting studs 68 and 69, electrically connected to the rings 58 and 61 respectively.

Rigidly fixed within the shell 57 and disposed along a diameter parallel to those upon which are located the two groups of conducting studs 66—67 and 68—69, is a smooth rod 70 adapted to be rotated with said shell as the shaft 16 is caused to revolve. Encircling the rod 70 and, adapted for restricted motion therealong, is a weighted member 71 having its center of gravity on the side of the axis of the shaft 16 toward the studs 66—67, but normally urged by means of a spring 72 into engagement with the studs 68—69. The engaging surfaces of the member 71 are formed of conducting material, whereby whichever pair of studs is engaged by said member will be placed in mutual electrical communication.

The electrical connections between the rings carried by the shell 57 and the external circuits of the device are made through the brushes 62, 63, 64 and 65 in the following manner:—The conductors 50 and 51 (hereinbefore for purposes of explanation having been assumed to be connected at A), are separated, and connected to brushes 62 and 65 respectively. The conductors 44 and 46, attached to the terminals of the winding 39 of the coil 37, are connected to the brushes 63 and 64 respectively.

The operation of the mechanism as hereinbefore described was based on the assumption that the conductors 50—51 are joined together at the point A, as shown in Fig. 1; and under such a condition no means for breaking the circuit which carries the relay and galvanometer currents was apparent. Under actual operating conditions, and with the centrifugal mechanism 55 connected to the circuits as indicated, the operation will be as hereinbefore set forth so long as the studs 68—69 in said centrifugal device are bridged by the contacting member 71 being maintained in engagement with said studs by the influence of compression spring 72, thus establishing a positive connection through the rings 58—61 and the brushes 62—65, and establishing a condition similar to that provided by the junction of the conductors 50—51 at A in Fig. 1. Under the operating condition as set forth, the motor 20 will be actuated in a direction to move the sliding contact 15 along the slide-wire 11 in a sense to establish balance in the potentiometer circuit of which said slide-wire forms a part. The contacting member 71 as hereinbefore pointed out, while pressed into engagement with the studs 68—69 by the spring 72, is positioned to have its center of gravity on the side of the axis of the shaft 16 remote from said studs, so that, as the speed of rotation of the device 55 is increased, the centrifugal force acting upon the member 71 will tend to move it in opposition to the influence of the spring 72 out of engagement with the studs 68—69 and into engagement with the studs 66—67. When the motor 20 and the mechanism driven thereby attains the critical velocity to which the member 71 is adjusted to respond to centrifugal force and bridge the studs 66—67 the electrical connection between said studs, and therefore directly between the conductors 44—46, will be established at the same time as the circuit between the studs 68—69, and therefore between the conductors 50—51, is opened.

The opening of the latter circuit will serve to deenergize the coil 26, allowing the relay mechanism actuated thereby to revert to its neutral position under the influence of the associated control springs, thus in turn de-energizing the motor 20 and allowing it to decelerate. At the same time, the interruption of current flow in the winding 38 on the element 37 will remove the supplemental torque upon said coil and render the galvanometer position subject solely to such current as may be flowing in the winding 39. The short-circuiting of the studs 66—67 in the centrifugal device 55 will provide through the rings 59—60, the brushes 63—64, and the conductors 46—44, a short-circuit across the actuating winding 39 of the coil 37, thereby introducing a damping effect dependent upon the resistance of the galvanometer circuit. This effect prevents any tendency for the galvanometer to rebound, and upon removal of the effect of the supplemental current flowing in the winding 38, allows the moving element 37 under the influence of the associated control springs to revert to a neutral position, causing contact 40 to separate from whichever of the two contacts 41—42 it may have been in engagement with, without at the same time bouncing against the other contact. Because of the inertia of the moving parts of the mechanism, deceleration of the motor will be materially slower than response of the galvanometer, and the contacting member 71 will remain in engagement with the studs 66—67 for a longer period than that required for the contact 40 of the galvanometer to assume a neutral position so that said last named contact will remain in said neutral position until the motor 20 and the mechanism driven thereby has decelerated sufficiently to allow the member 71 under the influence of spring 72 to revert to its normal position wherein studs 68—69 are connected and studs 66—67 are separated. The separation of said last named studs will remove the short-circuit from the galvanometer winding 39, and, should a condition of unbalance still exist, will allow the corresponding unbalanced current to pass through the winding 39 of the galvanometer, again deflecting said galvanometer until the contact 40 engages the contact 41 or 42, depending upon the nature of the unbalance, whereupon the cycle of operation of the motor and the centrifugal device is again initiated. As a condition of balance is approached, the current passing through the winding 39 of the galvanometer will become less, with a correspondingly weakened torque on the moving element, so that in the intervals between successive impulses the closing of the galvanometer contacts will be more and more delayed, thus allowing the motor progressively increasing deceleration periods, so that each successive start will be made from a condition of lower velocity than that in the preceding interval, with a consequently increased time preceding attainment of a speed corresponding to the set velocity of the centrifugal device, causing the final approach to the balance position to be effected in a series of impulses or increments of displacement spaced apart by time intervals of progressively increasing duration, until a true condition of balance is established, allowing the mechanism to come to rest with the pointer 17 bearing to the graduated scale 18 a relation which is a measure of the electromotive force developed at the source 47.

In Figs. 3 and 4 is shown a modified form of the invention applied to the automatic control of temperature by adjustment of the position of a valve through which a heating agent is admitted to a space whose temperature is to be regulated. An oven or other enclosed chamber 75 is adapted to be heated by fluid fuel admitted thereto through a conduit 76 in which is a valve 77, whereby the admission of said fuel may be controlled. Adjustment of the valve 77 is effected by means of an electric motor 78 having a shaft 79 carrying a pinion 80 meshing with a gear 81 which carries a crank 82 from which a link 83 is operably connected to the stem of the valve 77. Temperature within the chamber 75 is detected by means of a thermocouple 85 having connected thereto a pair of conductors 86, 87, between which will be developed an E. M. F. representative of the temperature within said chamber.

A combined galvanometer and relay structure similar to that shown in Fig. 1, comprises two movable galvanometer elements 88—89 freely pivoted for independent angular deflection between the poles of magnets 90 and 91, whereby there is provided a structure similar to that shown in Fig. 3 of my co-pending application Serial No. 485,581. (For the purpose of enabling an unobstructed view to be had of the moving elements and associated parts, the magnet 91 is shown as displaced from its normal position corresponding to that of the magnet 90.)

Details of the mechanical structure by means of which the movable galvanometer element 88 is caused to function in this instance as a temperature measuring device will be understood by reference to Fig. 4. The movable element 88 is carried by a spindle or shaft 92 pivoted in bearings not shown in the drawing, whereby said element and shaft may deflect freely between the poles of the magnets 90 and 91, the deflection being limited by a spiral spring 93, so that the angular position of the moving element will be a measure of the torque developed therein due to reaction between the flux from the magnets 90 and 91 and electric current flowing in windings hereinafter to be described. This construction is identical to that of the well-known deflecting galvanometer or millivoltmeter movement, and for purposes of distinction, the element 88 will hereinafter be referred to as the "millivoltmeter element." A pointer 94 movable with said element 88 and cooperating with a graduated scale 95 (shown only in part), may be used to provide a measure of the deflected position of the millivoltmeter element 88, and therefore of such magnitude (e. g. temperature) as is quantitatively represented by current flowing in its winding. Mounted coaxially with the shaft or spindle 92 is an adjustably rotatable arm 96 bearing an index or pointer 97 adapted to cooperate with the scale 95 in providing an identification of the adjusted position of said arm. Carried by the arm 96 are two opposed insulated electrical contacts 98 and 99; and carried by the pointer 94 is an insulated contact 100 positioned between the contacts 98 and 99, and juxtaposed thereto to engage one or other of the same, according to deflection of the pointer 94 from a position corresponding to the adjusted position of the arm 96.

Carried by the millivoltmeter element 88 are two electrically independent windings 102 and 103; and carried by the movable element 89 is a single winding 104, said windings being provided with flexible leading-in springs for connection to external circuits in a manner presently to be set forth. Fixed to the movable element 89 for deflection therewith are two contacts 108 and 109 insulated from each other and from the winding 104. Contact 108 is adapted to engage either of two stationary contact members 110 and 111, according to the sense of deflection of the movable element 89; and contact 109 is adapted to engage either of two stationary contacts 112 and 113, according to the sense of deflection of said movable element.

Mounted upon the shaft of the motor 78 is a centrifugal device 115 comprising a supporting ring 116 having diametrically fixed therein a smooth rod 117 upon which is slidably mounted a weighted member 118 having its center of gravity to one side of the axis of the motor shaft. Fixed to the interior surface of the supporting ring 116 and adjacent to one end of the rod 117 are two insulated contact studs 119 adapted to be engaged and bridged by the surface of the said member 118 when the latter is forced into contact therewith by the influence of a compression spring 120 surrounding the rod 117 at the end remote from the studs 119. Encircling the supporting ring 116 are insulated collector rings 121 and 122 individually connected to the studs 119, and in turn engaged by stationary brushes 123 and 124, whereby connection to an outside circuit may be provided. The positioning and adjustment of the parts carried by the mounting ring 116 are made such that, when the shaft 79 is rotated below a predetermined critical velocity, the said member 118, under the influence of the spring 120, will remain in contact with the studs 119, thereby providing connection between the brushes 123 and 124; and when the rate of rotation of said shaft exceeds said critical velocity, the said member 118 under the influence of centrifugal force acting in opposition to that of the spring 120, will be moved along the rod 117 in a sense to clear the contact studs 119, electrically separating the same, and thereby opening the circuit between the brushes 123 and 124.

The scheme of connection which is used with the form of the invention shown in Fig. 3 is known as a single-wire grounded D.-C. system, and is especially applicable where there is available a continuous metallic return, as on airplanes, land vehicles, and ships. The motor 78 is provided with an armature 125 having brushes 126—127, and a permanent magnet field 128, whereby reversible operation of said motor may be obtained according to the polarity of E. M. F. applied to said brushes. A suitable battery 130, having one end grounded, provides power for the operation of the system. The ungrounded end of the battery 130 is connected by means of a conductor 131 to the adjustable contact 98 of the galvanometer element 88 and also to the movable contact 108 of the relay element 89. Two equal resistances 132 and 133 are connected in series between the conductor 131 and ground. The adjustable contact 99 of the galvanometer element, and the movable contact 109 of the relay element are both connected to ground. One end of the winding 102 on the moving element 88 is connected to the movable contact 100, and the other end of said winding is connected to one end of the winding 104 on the movable element 89. The two ends of the winding 103 on the movable element 88 are connected to the conductors 86 and 87. The stationary contacts 110 and 113 are connected together, and, by means of a conductor 136, to the brush 126 of the motor 78. The stationary contacts 111 and 112 are connected together and, by means of a conductor 137, to the brush 127 of the motor 78. It will be seen that the combination of fixed and stationary contacts subject to actuation by the deflection of the moving element 89 thus constitutes a reversing switch, whereby current from the battery 130 may pass through a circuit including the conductors 131, 136, 137, the contacts actuated by the moving element 89, and ground, and will be applied to the terminals of the motor 78 with a polarity depending upon the deflected position of said moving element.

The free end of the winding 104 on the movable element 89 is connected by means of a conductor 138 to the brush 123 on the centrifugal device 115; and the brush 124 on said centrifugal device is connected by means of a conductor 139 to the point of junction of the series connected resistors 132 and 133.

Operation of the form of the invention shown in Figs. 3 and 4 may be described as follows: Assuming first that the temperature within the chamber 75, as determined by the thermocouple 85 and indicated by the pointer 94 on the scale 95, is in agreement with the value to which the index 97 is set with respect to said scale, the contact 100 will float between the contacts 98 and 99, without engaging either, with the result that there will be no current in the winding 103 on the moving element 89, so that the contacts actuated by said moving element will stand open, and the motor 78 will be at rest, maintaining the valve 77 in a fixed position. It may now be assumed that for some cause the temperature within the chamber 75 is reduced, and that the pointer 94 of the temperature responsive millivoltmeter element 88 swings in a sense to bring the contact elements 100 and 98 into engagement. Current will flow from the conductor 131 through said contacts and the winding 102 on the millivoltmeter element 88 and also through the winding 104 on the element 89, and through conductor 138 to brush 123 on the centrifugal device 115, which latter device being at rest will permit current to pass from the collector ring 121 through the contact studs 119, the face of the weighted member 118, the collector ring 122, the brush 124, and the conductor 139, to the junction point between the resistors 132 and 133, and thence completing the circuit through the latter resistance member and ground to the battery 130. Relative polarities having been suitably selected, said current, passing through the winding 102 on the movable element 88, will tend to amplify the original torque derived from the current in the thermoelectric circuit, and will urge the contact 100 into more intimate engagement with the contact 98, thus tending to eliminate any tendency toward chattering or uncertainty of contact due to the relatively weak thermoelectric current. Also the current flowing in the winding 104 on the element 89 will tend to deflect said element in such a sense as to bring contact 108 into engagement with contact 111, and contact 109 into engagement with contact 113. Current will then flow from the battery 130 through conductor 131, contacts 108 and 111, conductor 137, the brushes and armature of motor 78, conductor 136, and contacts 113 and 109 to ground, thence completing its circuit to the battery 130. The armature of motor 78 will be caused to rotate in such a direction that the pinion 80, acting upon the gear 81 will rotate the latter in a sense to cause the crank 82 and the link 83 to operate the valve 77 to admit to the chamber 75 an increased supply of fuel, thus tending to raise the temperature to offset the lowering detected by the thermocouple 85. As hereinbefore pointed out, so long as a predetermined critical speed is not exceeded, the member 118 will cause a complete circuit to be provided between the brushes 123 and 124, allowing an uninterrupted flow of the current which is carried by conductors 138 and 139. As said critical velocity is exceeded, the said member 118, acting under the influence of centrifugal force, and in opposition to the spring 120, will be separated from the studs 119, opening the circuit between them, and thus interrupting the flow of current through the windings 102 and 104 in the galvanometer instrument.

Interruption of current in the winding 104 will allow the moving element 89 to revert to its normal neutral position, under the influence of its associated control springs, opening the circuit between contacts 108—111 and contacts 109—113, thereby interrupting the supply of current through the conductors 136 and 137 to the motor 78. Interruption of current in the winding 102 will remove the amplifying force from the moving element 88 and will leave the same subject entirely to such torque as may be developed by current from the thermocouple 85 flowing in the winding 103. Should the temperature as indicated by said thermocouple have risen to the value indicated by the index 97 with respect to the scale 95, the torque developed on the moving element 88 will balance the force of the spring 93, and the contact 100 will again float freely between contacts 98 and 99, and the system will come to rest with the valve 77 in a new adjusted position. Should it be that the temperature value attained within the chamber 75 is still below that at which the index 97 is set on the scale 95, the contacts 100—98 will remain in engagement with a consequent repetition of the cycle as described; and this performance will be repeated as often as necessary until the desired temperature value is attained. As the difference between the torques developed by the spring 93 and the thermocouple current flowing in the winding 103 becomes progressively less, the force tending to maintain contacts 98—100 in engagement between impulses is likewise reduced with a consequent progressively increasing time interval between consecutive impulses, until there is attained a condition of balance corresponding to the setting of the index 97, when the motor 78 will remain de-energized, and the value 77 will come to rest.

In the event of an increase of temperature at the thermocouple 85 following the establishment of a condition of equilibrium, the thermocouple current flowing through the winding 103 on the millivoltmeter element 88, will tend to deflect the same in a sense to bring the contacts 100 and 99 into engagement. A circuit will thus be provided from the battery 130 through the junction point of the resistors 132 and 133, the conductor 139, the elements of the centrifugal device 115, the conductor 138, the windings 104 and 102 on the elements 89 and 88 respectively, and the contacts 100—99 to ground. The current so flowing will tend to deflect the element 89 in a sense opposite to that hereinbefore described, actuating the contact system associated therewith in a sense to operate the motor 78 to close the valve 77. Said current, flowing through the winding 102, will tend to amplify the pressure between the contacts 100—99, in a manner similar to that hereinbefore described in connection with the interaction of the contacts 100—98. The centrifugal device 115 will act in a manner identical to that hereinbefore described, with the result that the valve 77 will be caused to approach a position of equilibrium by a series of increasingly spaced impulses.

Because of the inherent damping of the pyrometer circuit, as completed through the thermocouple 85 and associated conductors, which damping may if desired be supplemented by forming the moving element 89 of conducting material, and also because the requirements of automatic control, where considerable time lag is inherent in the normal response, a control of the class shown in Fig. 3 does not ordinarily call for the refinement represented by rendering the galvanometer damping subject to the motor speed, as shown in Fig. 1. The centrifugal device 115 is accordingly shown as provided with only one set of contacts; but it will be obvious that, should such refinement be found desirable, there may be added to said device circuit-closing contacts corresponding to studs 66 and 67 in Fig. 2, together with the auxiliary connections necessary to introduce the desired additional damping characteristic.

In Fig. 5 is shown a form of centrifugal device which may expediently be substituted for the device 115 shown in Fig. 3, for the purpose of interrupting the regenerative current in the circuit of the relay and the galvanometer. A hub member 141 is adapted for mounting upon the shaft 79 of the motor whose operation is to be controlled, and, if desired, may be provided with a bushing for electrically insulating said hub from said shaft. Carried by the hub member and insulated therefrom by an insulating bushing 142 is a block 143 adapted to provide a circuit for elements of the centrifugal device presently to be described. Smooth surfaces are provided on the hub 141 and the block 143 adjacent to, and on opposite sides of the bushing 142, upon which surfaces may rest brushes 144 and 145 to provide connection to conductors 138 and 139 of Fig. 3. The block 143 is provided at one side with a contact surface 146; and engaging said contact surface is a weighted member 147 having projecting arms 148 and 149, and also being provided with a contact surface 150 to engage the corresponding surface 146 of the block 143. An insulated screw 151, passing freely through a radially disposed opening in the member 147 and through said contact surfaces, and threaded into the block 143, provides for motion of the weighted member 147 relative to the block 143 and in a sense radial to the shaft 79 upon which the hub 141 is mounted. The head of the screw 151 is provided with an insulating washer 152 which serves to limit the motion of the weighted member 147 to a range only sufficient to open or close the electrical contact between the surface 146 and 150. Mounted upon the end of the block 143 remote from the contact surface 146, and insulated from said block, by a non-conducting barrier 153, is a weighted member 154 of dimensions similar to those of the member 147, and having projecting arms 155 and 156 corresponding to and opposed to the arms 148 and 149 of said member 147. Extended between the arms 148 and 155 is a tension spring 157 and similarly extended between the arms 149 and 156 is a tension spring 158, the action of said springs being such as to maintain the movable element 147 with its contact surface 150 in engagement with the contact surface 146 on the block 143. A pin or screw 159 formed of conducting material electrically connecting the weighted member 154 to the hub 141, but insulated from the block 143, completes a circuit whereby, when surfaces 150 and 146 are in engagement, electric current may flow freely from the brush 144 through the material of the block 143, the contact surfaces 146 and 150, the weighted member 147, the arms 148 and 149, the springs 157 and 158, the arms 155 and 156, the weighted member 154, said pin 159, and the hub member 141, to the brush 145. This condition exists at all times when the mechanism is not rotating at a speed above the critical velocity at which centrifugal force, in opposition to the influence of the springs 157 and 158, will cause the weighted member 146 to move radially until it engages the insulating washer 152, when the separation of the surfaces 146 and 150 will serve to interrupt the circuit between the brushes 144 and 145. The member 154 is adjusted to such a weight that the centrifugal device, when operating with its contacts closed will be in substantially perfect balance about the axis of the hub 141; and because of the limited motion of the member 147 necessary to separate the contact surfaces 146 and 150, this balance will not be seriously disturbed, when said critical velocity is exceeded. For purposes of improving electrical conductivity and minimizing the possibility of erratic performance, the springs 157 and 158 may be shunted by pigtails 159 and 160 of flexible conducting material such as a braided copper conductor.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a self-balancing control system, the combination of a motor for effecting a condition of balance in said system, means for producing an electrical effect representative of a condition of unbalance, a circuit-controlling instrument responsive to said electrical effect, a relay subject to said instrument and adapted to affect the performance of said motor, means subject to said instrument when responding to said electrical effect and adapted to intensify the response of the same, and a velocity-responsive device operable at a speed representative of that of said motor and adapted at a predetermined velocity to remove both said relay and said intensifying means from the control of said instrument.

2. In a self-balancing system, the combination of a reversible motor operable in either direction according to the sense of unbalance in said system to restore a balanced condition, a circuit-controlling instrument responsive to a condition of unbalance, a relay including a member deflectable to two operating positions and a neutral position corresponding respectively to operation of said motor in either direction and to a condition of rest, said relay having a circuit subject to said instrument whereby to deflect said member to either of its operating positions according to the sense of response of said instrument, auxiliary means subject to said instrument and adapted to intensify its response, together with a velocity-responsive device operable at a speed representative of that of said motor and adapted at a predetermined velocity to inhibit the action of said intensifying means and to interrupt the circuit of said relay whereby the latter will assume its neutral position.

3. In a self-balancing system, the combination of a motor for effecting a condition of balance in said system, a relay adapted to control the operation of said motor, a galvanometer having means for actuating said relay and including a winding, means rendered effective by a condition of unbalance to produce a current in said winding, an electrical circuit and a source of power therefor subject to said actuating means to produce an auxiliary current in said winding to intensify the action of said galvanometer, together with a velocity-responsive device operable at a speed representative of that of said motor and adapted at a predetermined velocity to interrupt the flow of said auxiliary current and also to divert from said galvanometer winding current produced due to said condition of unbalance.

4. In a self-balancing system, the combination of a motor for effecting a condition of balance in said system, a relay adapted to control the operation of said motor and having an actuating winding, a current-sensitive galvanometer having circuit-controlling means, means rendered effective by a condition of unbalance to produce in said galvanometer a current to render operative said circuit-controlling means, a source of power and a circuit including said relay, said galvanometer, said circuit-controlling means and said source, whereby upon response of said galvanometer to an unbalance condition current will flow from said source through a winding of said galvanometer and through the winding of said relay to actuate the same, together with a velocity-responsive device operable at a speed representative of that of said motor and adapted at a predetermined velocity to interrupt the flow of said controlled current, and also to divert from said galvanometer current produced due to said condition of unbalance.

5. In a self-balancing control system, the combination of a motor for effecting a condition of balance in said system, means for producing an electrical effect representative of a condition of unbalance, a circuit-controlling instrument responsive to said electrical effect, a relay subject to said instrument and adapted to affect the performance of said motor, a velocity-responsive device operable at a speed representative of that of said motor and means controlled by said device at a predetermined velocity to inhibit the effect of said relay independently of the condition of balance or unbalance in said system.

6. In a self-balancing control system, the combination of a motor for effecting a condition of balance in said system, means for producing an electrical effect representative of a condition of unbalance, a circuit-controlling instrument responsive to said electrical effect, a relay subject to said instrument and adapted to affect the performance of said motor, means subject to said instrument when responding to said electrical effect and adapted to intensify the response of the same, and a velocity-responsive device operable at a speed representative of that of said motor and adapted at a predetermined velocity to remove said intensifying means from the control of said instrument.

7. In a control system, an electrical network, a motor for effecting a condition of balance in said network, means responsive to variations in a variable magnitude for unbalancing said network, a galvanometer having a winding for receiving electrical current corresponding to the extent of unbalance of said network, a relay for controlling the performance of said motor, contact means controlled by said galvanometer and connected to said relay for controlling the operation of the latter, other contact means in the connections between said galvanometer and said relay, the last-mentioned contact means being disconnected from said network, and velocity-responsive means operable at a speed representative of that of said motor for operating the last-mentioned contact means to throw said relay out of action upon the attainment of a predetermined velocity of said motor.

8. Apparatus for regulating a variable condition, comprising means responsive to said condition, a motor for controlling an agent for regulating said condition, a galvanometer, means connecting said responsive means to said galvanometer for effecting operation of the latter upon change in the magnitude of said condition, a relay for controlling the performance of said motor, contact means controlled by said galvanometer for controlling said relay, other contact means between said galvanometer contact means and said relay, said other contact means being disconnected from said means connecting said responsive means to said galvanometer, and velocity-responsive means operable at a speed representative of that of said motor for operating said last-mentioned contact means to throw said relay out of action upon the attainment of a predetermined velocity of said motor.

9. In a self-balancing system, the combination of a motor for effecting a condition of balance in said system, a relay adapted to control the operation of said motor, a current-sensitive galvanometer having circuit-controlling means, connections effective in response to a condition of unbalance in said system to produce in a winding of said galvanometer a current to render operative said circuit-controlling means and to cause said relay to bring said motor into action, a velocity-responsive device operable at a speed representative of that of said motor, and means controlled by said velocity-responsive device for operation at a predetermined velocity to short-circuit the winding of said galvanometer and thereby to divert from said galvanometer current produced due to said condition of unbalance.

JOHN ROBERT PATTEE.

REFERENCES CITED

The following references are of record in the file of this patent:

UNITED STATES PATENTS

| Number | Name | Date |
|---|---|---|
| 2,112,218 | Gille | Mar. 22, 1938 |
| 2,115,834 | Young | May 3, 1938 |